US012074373B2

(12) United States Patent
Wu et al.

(10) Patent No.: US 12,074,373 B2
(45) Date of Patent: Aug. 27, 2024

(54) PHASED ARRAY ANTENNA SYSTEM AND ELECTRONIC DEVICE

(71) Applicant: BOE Technology Group Co., Ltd., Beijing (CN)

(72) Inventors: Qianhong Wu, Beijing (CN); Jingwen Guo, Beijing (CN); Chunxin Li, Beijing (CN); Jia Fang, Beijing (CN); Feng Qu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 490 days.

(21) Appl. No.: 17/426,651

(22) PCT Filed: Oct. 28, 2020

(86) PCT No.: PCT/CN2020/124264
§ 371 (c)(1),
(2) Date: Jul. 29, 2021

(87) PCT Pub. No.: WO2022/087872
PCT Pub. Date: May 5, 2022

(65) Prior Publication Data
US 2022/0320750 A1 Oct. 6, 2022

(51) Int. Cl.

| | |
|---|---|
| ***H01Q 21/06*** | (2006.01) |
| ***H01P 1/12*** | (2006.01) |
| ***H01P 1/18*** | (2006.01) |
| ***H01Q 3/36*** | (2006.01) |
| ***H01Q 3/38*** | (2006.01) |

(52) U.S. Cl.
CPC .............. *H01Q 21/06* (2013.01); *H01P 1/12* (2013.01); *H01P 1/18* (2013.01); *H01P 1/184* (2013.01); *H01Q 3/36* (2013.01); *H01Q 3/38* (2013.01)

(58) Field of Classification Search
CPC ........... H01Q 21/06; H01Q 3/36; H01Q 3/38; H01Q 1/241; H01Q 3/32; H01P 1/12; H01P 1/18; H01P 1/184; H01P 5/028; H01P 5/08
See application file for complete search history.

(56) References Cited

U.S. PATENT DOCUMENTS 6,686,885 B1 * 2/2004 Barkdoll ................ H01P 1/184 342/372
2002/0126048 A1 9/2002 Zhu et al.
2014/0266897 A1 9/2014 Jakoby et al.

FOREIGN PATENT DOCUMENTS

| | | | | |
|---|---|---|---|---|
| CN | 1373916 A | | 10/2002 | |
| CN | 1851972 A | * | 10/2006 | |
| CN | 1851972 A | | 10/2006 | |
| CN | 102306861 A | | 1/2012 | |
| WO | WO-0120720 A1 | * | 3/2001 | ............. H01P 1/181 |

* cited by examiner

*Primary Examiner* — Daniel D Chang
(74) *Attorney, Agent, or Firm* — Ling Wu; Stephen Yang; Ling and Yang Intellectual Property

(57) ABSTRACT

A phased array antenna system is provided, including a feed structure and at least one phased array antenna element, wherein the at least one phased array antenna element includes a first impedance transformation unit, an MEMS phase-shifting multi-unit and an antenna. The first impedance transformation unit is connected to a feed structure, and the MEMS phase-shifting multi-unit is connected between the first impedance transformation unit and the antenna.

19 Claims, 12 Drawing Sheets

PHASED ARRAY ANTENNA SYSTEM AND ELECTRONIC DEVICE

CROSS-REFERENCE TO RELATED APPLICATION

The present disclosure is a U.S. National Phase Entry of International Application PCT/CN2020/124264 having an international filing date of Oct. 28, 2020, and the contents disclosed in the above-mentioned application are hereby incorporated as a part of this application.

TECHNICAL FIELD

The present disclosure relates to, but is not limited to, the technical field of communication, in particular to a phased array antenna system and an electronic device.

BACKGROUND

Phased array antenna is the most important form of antenna in satellite mobile communication system nowadays. Compared with a traditional mechanical scanning antenna, the antenna plane of a phased array antenna does not need to be rotated mechanically, and the spatial movement and scanning of antenna beam pointing mainly relies on the phase change, thus the phased array antenna has various advantages such as small size, low profile, fast response speed, wide scanning range and high scanning accuracy. The phased array antenna is widely applied to, for example, communication between vehicles and satellites, array radar for unmanned driving or security array radar.

SUMMARY

The following is a summary of subject matter described in detail herein. This summary is not intended to limit the protection scope of the claims.

Embodiments of the present disclosure provide a phased array antenna system and an electronic device.

In one aspect, an embodiment of the present disclosure provides a phased array antenna system, which includes a feed structure and at least one phased array antenna element. The at least one phased array antenna element includes a first impedance transformation unit, an MEMS phase-shifting multi-unit and an antenna. The first impedance transformation unit is connected between the feed structure and the MEMS phase-shifting multi-unit, and the MEMS phase-shifting multi-unit is connected between the first impedance transformation unit and the antenna.

In another aspect, an embodiment of the present disclosure provides an electronic device including the aforementioned phased array antenna system.

Other aspects will be understood after the drawings and the detailed description are read and understood.

BRIEF DESCRIPTION OF DRAWINGS

Accompanying drawings are used to provide a further understanding of technical solutions of the present disclosure and constitute a part of the specification to explain the technical solutions of the present disclosure together with embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
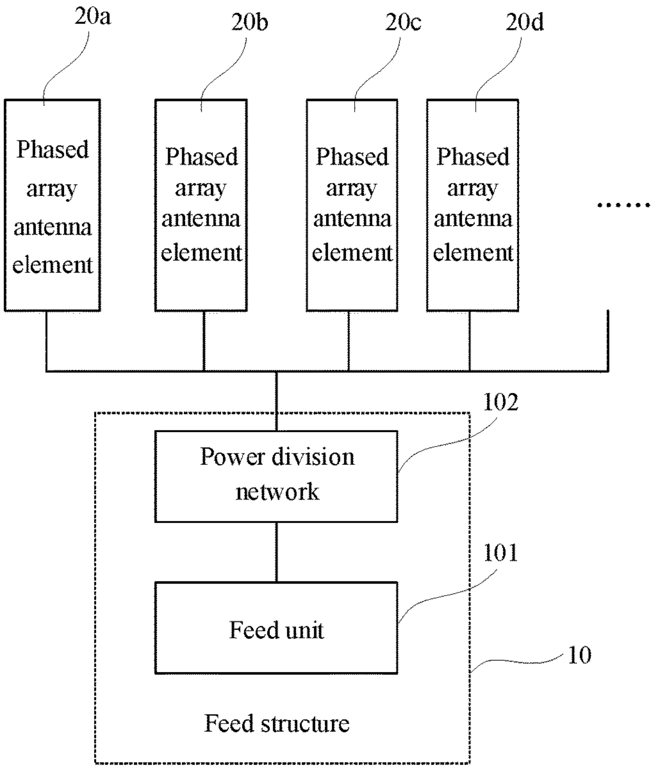
FIG. 1 is a schematic diagram of a structure of a phased array antenna system according to at least one embodiment of the present disclosure.

To make the objects, technical solutions and advantages of the present disclosure more clear, embodiments of the present disclosure will be described in detail below with reference to the drawings. The embodiments may be implemented in a number of different forms. Those of ordinary skills in the art will readily understand the fact that implementations and contents may be transformed into one or more forms without departing from the essence and scope of the present disclosure. Therefore, the present disclosure should not be construed as being limited only to what is described in the following embodiments. The embodiments and features in the embodiments in the present disclosure may be combined randomly if there is no conflict.

In the drawings, size of one or more constituent elements, or thickness or area of a layer, is sometimes exaggerated for clarity. Therefore, an embodiment of the present disclosure is not necessarily limited to the size, and shapes and dimensions of multiple components in the drawings do not reflect real scales. In addition, the drawings schematically show ideal examples, and an implementation of the present disclosure is not limited to the shapes or values shown in the drawings.

The “first”, “second”, “third” and other ordinal numbers in the present disclosure are used to avoid confusion between constituent elements, not to provide any quantitative limitation. In the description of the present disclosure, “multiple” means two or more counts.

In the present disclosure, for the sake of convenience, wordings such as “central”, “upper”, “lower”, “front”, “rear”, “vertical”, “horizontal”, “top”, “bottom”, “inner”, “outer” and the others describing orientations or positional relations are used to depict the positional relations between constituent elements with reference to the drawings, which are only for an easy and simplified description of the present disclosure, rather than for indicating or implying that the device or element referred to must have a specific orientation, or must be constructed and operated in a particular orientation and therefore, those wordings cannot be construed as limitations on the present disclosure. The positional relations between the constituent elements may be appropriately changed according to the direction in which constituent elements are described. Therefore, the wordings are not limited in the specification, and may be replaced appropriately according to situations.

In the present disclosure, the terms “install”, “connect” and “couple” shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand the specific meanings of the above terms in the present disclosure according to situations.

In the present disclosure, “an electrical connection” includes a case where constituent elements are connected via an element having a certain electrical action. The “element with a certain electric action” is not particularly limited as long as it can transmit and receive electrical signals between the connected constituent elements. Examples of the “element having a certain electrical action” not only include electrodes and wirings, but also include switching elements such as transistors, resistors, inductors, capacitors, and other elements with one or more functions.

In the present disclosure, “parallel” refers to a state in which an angle formed by two straight lines is above −10 degrees and below 10 degrees, and thus may include a state in which the angle is above −5 degrees and below 5 degrees. In addition, “perpendicular” refers to a state in which an angle formed by two straight lines is above 80 degrees and below 100 degrees, and thus may include a state in which the angle is above 85 degrees and below 95 degrees.

“About” in the present disclose means that limits of a value are not limited strictly, and the value is within a range of process and measurement errors.

In the present disclosure, a Micro Electromechanical System (MEMS) refers to a high-tech device with a size of several millimeters or even smaller, and its internal structure is generally on the order of microns or even nanometers, and it is an independent intelligent system.

In the present disclosure, a Coplanar Waveguide (CPW) refers to a structure formed by manufacturing a central conductor strip on one surface of a dielectric substrate and manufacturing conductor planes on two sides close to the central conductor strip, which is also called a coplanar micro-strip transmission line.

In the present disclosure, a Micro-strip (MS) refers to a microwave transmission line formed by a single conductor strip supported on a dielectric substrate.

At least one embodiment of the present disclosure provides a phased array antenna system, which includes a feed structure and at least one phased array antenna element. At least one phased array antenna element includes a first impedance transformation unit, an MEMS phase-shifting multi-unit and an antenna. The first impedance transformation unit is connected to the feed structure, and the MEMS phase-shifting multi-unit is connected between the first impedance transformation unit and the antenna.

In this embodiment, the phased array antenna system is formed by the combination of the MEMS phase-shifting multi-unit and the antenna, and the phased array antenna system with advantages such as short response time (for example, on the order of microsecond), low loss, no temperature limitation is implemented. Impedance matching between the feed structure and the MEMS phase-shifting multi-unit can be achieved through the first impedance transformation unit.

In some exemplary embodiments, the MEMS phase-shifting multi-unit includes a CPW structure with a feature impedance greater than 50 ohms. For example, the feature impedance of the CPW structure included in the MEMS phase-shifting multi-unit may be 100 ohms. However, this is not limited in the present embodiment. In this exemplary embodiment, increasing the feature impedance of the CPW structure included in the MEMS phase-shifting multi-unit can increase a phase-shifting degree of a single phase-shifting unit in the MEMS phase-shifting multi-unit, thereby reducing the number of single phase-shifting units in the MEMS phase-shifting unit and further reducing the loss of the phased array antenna system.

In some exemplary embodiments, at least one phased array antenna element further includes at least one switching unit. The at least one switching unit is connected to the first impedance transformation unit or the MEMS phase-shifting multi-unit, and is configured to achieve conversion between a micro-strip structure and a coplanar waveguide structure. The phased array antenna system of this exemplary embodiment adopts a switching unit to support various types of feed forms and antenna forms.

In some exemplary embodiments, the at least one switching unit includes a first switching unit. The first switching unit is connected between the feed structure and the first impedance transformation unit and is configured to achieve the conversion from a micro-strip structure to a coplanar waveguide structure. In this exemplary embodiment, by providing the first switching unit between the feed structure and the first impedance transformation unit, various types of feeding forms, such as direct feeding or slot coupling feeding, can be supported.

In some exemplary embodiments, the at least one switching unit includes a second switching unit. The second switching unit is connected between the MEMS phase-shifting multi-unit and the antenna and is configured to achieve the conversion from a coplanar waveguide structure to a micro-strip structure. In this exemplary embodiment, by providing the second switching unit between the MEMS phase-shifting multi-unit and the antenna, various types of antenna forms can be supported.

In some exemplary embodiments, the at least one phased array antenna element further includes a second impedance transformation unit. The second impedance transformation unit is connected between the MEMS phase-shifting multi-unit and the antenna. By providing the second impedance transformation unit, impedance matching between the MEMS phase-shifting multi-unit and the antenna can be achieved.

In some exemplary embodiments, the first impedance transformation unit at least includes a first impedance transformation structure connected between two CPW structures with different feature impedances. Among them, a feature impedance $Z_1$ of the first impedance transformation structure and feature impedances $Z_2$ and $Z_3$ of the two CPW structures connected to the first impedance transformation structure meet the following equation: $Z_1=\sqrt{Z_2 \times Z_3}$; or, the first impedance transformation structure is a gradual transition structure connected between two CPW structures with different feature impedances. In this exemplary embodiment, ¼ wavelength impedance transformation or gradual transition structure may be adopted to achieve impedance transformation.

In some exemplary embodiments, the at least one switching unit includes a switching structure connected between an MS structure and a CPW structure. The switching structure includes a signal switching line disposed on a first surface of the dielectric substrate and a first switching ground line disposed on a second surface of the dielectric substrate opposite to the first surface. The signal switching line is connected between an MS signal line of the MS structure and a CPW signal line of the CPW structure. The first switching ground line is formed by extending an MS ground line of the MS structure. A projection of the signal switching line on the dielectric substrate is located within a projection of the first switching ground line on the dielectric substrate.

In some exemplary embodiments, the switching structure includes a signal switching line and a second switching ground line disposed on a first surface of the dielectric substrate and a first switching ground line disposed on a second surface of the dielectric substrate opposite to the first surface. The signal switching line is connected between an MS signal line of an MS structure and a CPW signal line of a CPW structure. The first switching ground line is formed by extending an MS ground line of the MS structure, and the second switching ground line is formed by extending a CPW ground line of the CPW structure. A projection of the signal switching line on a dielectric substrate is located within a projection of the first switching ground line on the dielectric substrate. The signal switching line of the switching structure has an edge changing in a stepped manner along an extending direction, the first switching ground line has an edge changing in a stepped manner at a side close to the CPW structure, and the second switching ground line has an edge changing in a stepped manner at a side close to the MS structure. Or, the signal switching line of the switching structure has a gradually changing edge along the extending direction, the first switching ground line has a gradually changing edge at the side close to the CPW structure, and the second switching ground line has a gradually changing edge at the side close to the MS structure.

In some exemplary embodiments, the at least one switching unit includes a switching structure connected between an MS structure and a CPW structure, and the switching structure includes a grounded coplanar waveguide (GCPW) structure.

In some exemplary embodiments, the phased array antenna system further includes a slot coupling structure. The slot coupling structure is connected to the feed structure and is configured to feed the first switching unit through slot coupling. In this exemplary embodiment, by providing the slot coupling structure, slot coupling feeding can be achieved.

In some exemplary embodiments, the feed structure includes a feed unit. The feed unit includes a DC power supply, a vector network analyzer, a DC block, a T-shaped biaser and a radio frequency coaxial connector (SMA). The DC block is connected to the vector network analyzer, the T-type biaser is connected between the DC block and the SMA, the DC power supply is connected to the T-type biaser, and the SMA is connected to a phased array antenna element. Or, the feed unit includes a DC power supply, a vector network analyzer, a control circuit, a flexible circuit board and an SMA. The flexible circuit board is connected between the control circuit and the phased array antenna element, and the SMA is connected between the vector network analyzer and the phased array antenna element.

In some exemplary embodiments, the feed structure further includes a power division network, wherein the power division network is connected between a feed unit and multiple phased array antenna elements.

In some exemplary embodiments, the MEMS phase-shifting multi-unit includes at least sixteen phase-shifting units, and at least one phase-shifting unit includes a CPW signal line and a CPW ground line located on a same surface of the dielectric substrate, an insulating layer covering the CPW signal line, and a metal bridge located on a side of the insulating layer away from the dielectric substrate, wherein the metal bridge stretches across the CPW signal line. The CPW signal lines of the sixteen phase-shifting units are connected in sequence.

The phased array antenna system of this embodiment will be illustrated in the following by multiple examples.

FIG. 1 is a schematic diagram of a structure of a phased array antenna system according to at least one embodiment of the present disclosure. As shown in FIG. 1, the phased array antenna system according to the exemplary embodiment includes a feed structure 10 and multiple phased array antenna elements. Only four phased array antenna elements 20*a*, 20*b*, 20*c* and 20*d* are illustrated in FIG. 1. However, the number of the phased array antenna elements is not limited in this embodiment. As shown in FIG. 1, the feed structure 10 includes a feed unit 101 and a power division network 102. The power division network 102 is connected between the feed unit 101 and multiple phased array antenna elements. The feed unit 101 may feed the multiple phased array antenna elements through the power division network 102. In this exemplary embodiment, the multiple phased array antenna elements are combined to form a linear array and a plane array through a power division network, which can improve the gain of the phased array antenna system.

Figure 2A:
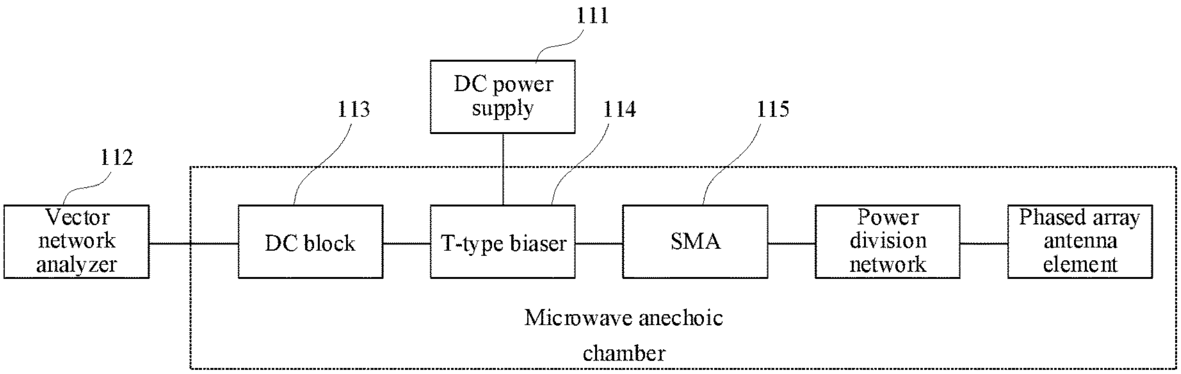
FIG. 2A is a schematic diagram of a feed structure according to at least one embodiment of the present disclosure.

FIG. 2A is a schematic diagram of a feed structure according to at least one embodiment of the present disclosure. As shown in FIG. 2A, a feed unit of this exemplary embodiment may include a DC power supply 111, a vector network analyzer 112, a DC block 113, a T-type biaser 114, and a radio frequency coaxial connector SMA 115. The DC block 113 is connected to the vector network analyzer 112, the T-type biaser 114 is connected between the DC block 113 and the SMA 115, the DC power supply 111 is connected to the T-type biaser 114, and the SMA 115 is connected to the power division network. The DC block 113, the T-type bias 114, the SMA 115, the power division network and phased array antenna elements are in a microwave anechoic chamber to eliminate external electromagnetic interference. The DC power supply 111 may provide a DC signal, and the vector network analyzer 112 may provide an RF signal. The DC block 113 may include a DC block circuit. The T-type biaser 114 may inject DC signal into a RF circuit without affecting RF signal passing through a main transmission path. In some examples, when the feed structure does not include a power division network, the T-type bias may be directly connected to the phased array antenna elements through the SMA. In the feed structure of this exemplary embodiment, a RF signal provided by the vector network analyzer and a DC signal provided by the DC power supply may be combined into one path and then input into a phased array antenna element.

Figure 2B:
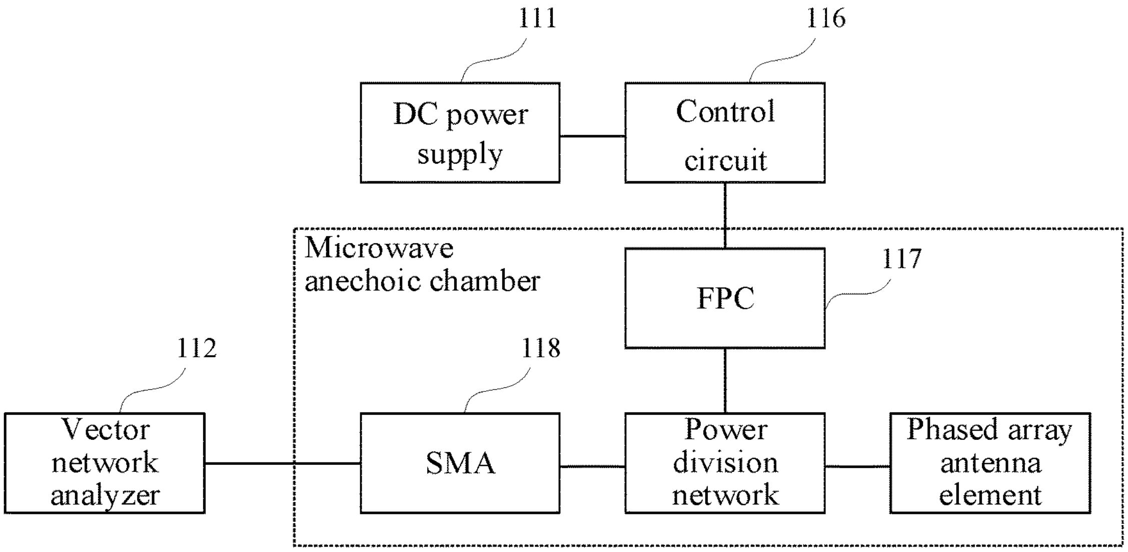
FIG. 2B is another schematic diagram of a feed structure according to at least one embodiment of the present disclosure.

FIG. 2B is another schematic diagram of a feed structure according to at least one embodiment of the present disclosure. As shown in FIG. 2B, a feed unit of this exemplary embodiment may include a DC power supply 111, a vector network analyzer 112, a control circuit 116, a flexible printed circuit (FPC) 117, and an SMA 118. Among them, the FPC 117, the SMA 118, the power division network and the phased array antenna elements are located in a microwave anechoic chamber to eliminate external electromagnetic interference. The DC power supply 111 may provide a DC signal, and the vector network analyzer 112 may provide an RF signal. The control circuit 116 is connected to the DC power supply 111, and may control the DC signals provided by the DC power supply 111. The FPC 117 is connected between the control circuit 116 and the power division network, and may achieve an electrical connection between the control circuit 116 and the power division network. The vector network analyzer 112 may provide an RF signal. The SMA 118 is connected between the vector network analyzer 112 and the power division network. In some examples, when the power division network is not included in the feed structure, the control circuit 116 may be directly connected to the phased array antenna elements through the FPC 117, and the vector network analyzer 112 may be directly connected to the phased array antenna elements through the SMA 118. In the feed structure of this exemplary embodiment, the RF signal provided by the vector network analyzer and the DC signal provided by the DC power supply may be independently input into a phased array antenna element.

Figure 3:
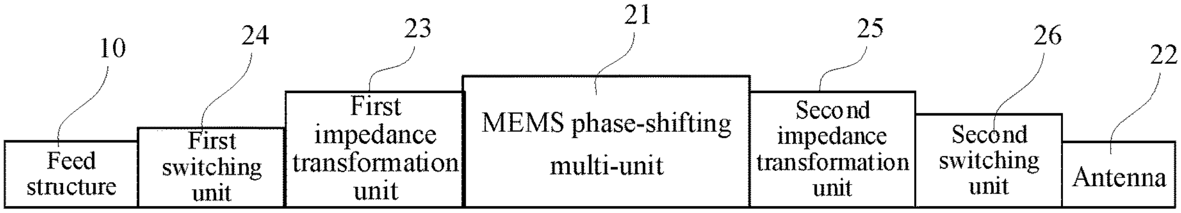
FIG. 3 is a schematic diagram of a structure of a phased array antenna element according to at least one embodiment of the present disclosure.

FIG. 3 is a schematic diagram of a structure of a phased array antenna element according to at least one embodiment of the present disclosure. As shown in FIG. 3, the phased array antenna element of this exemplary embodiment includes an MEMS phase-shifting multi-unit 21, an antenna 22, a first impedance transformation unit 23, a first switching unit 24, a second impedance transformation unit 25 and a second switching unit 26. The first switching unit 24 is connected between the feed structure 10 and the first impedance transformation unit 23, the MEMS phase shifting multi-unit 21 is connected between the first impedance transformation unit 23 and the second impedance transformation unit 25, and the second switching unit 26 is connected between the second impedance transformation unit 25 and the antenna 22. The MEMS phase-shifting multi-unit 21 includes a CPW structure with a feature impedance greater than 50 ohms. For example, the feature impedance of the CPW structure in the MEMS phase-shifting multi-unit may be 100 ohms. However, this is not limited in the present embodiment.

Figure 4:
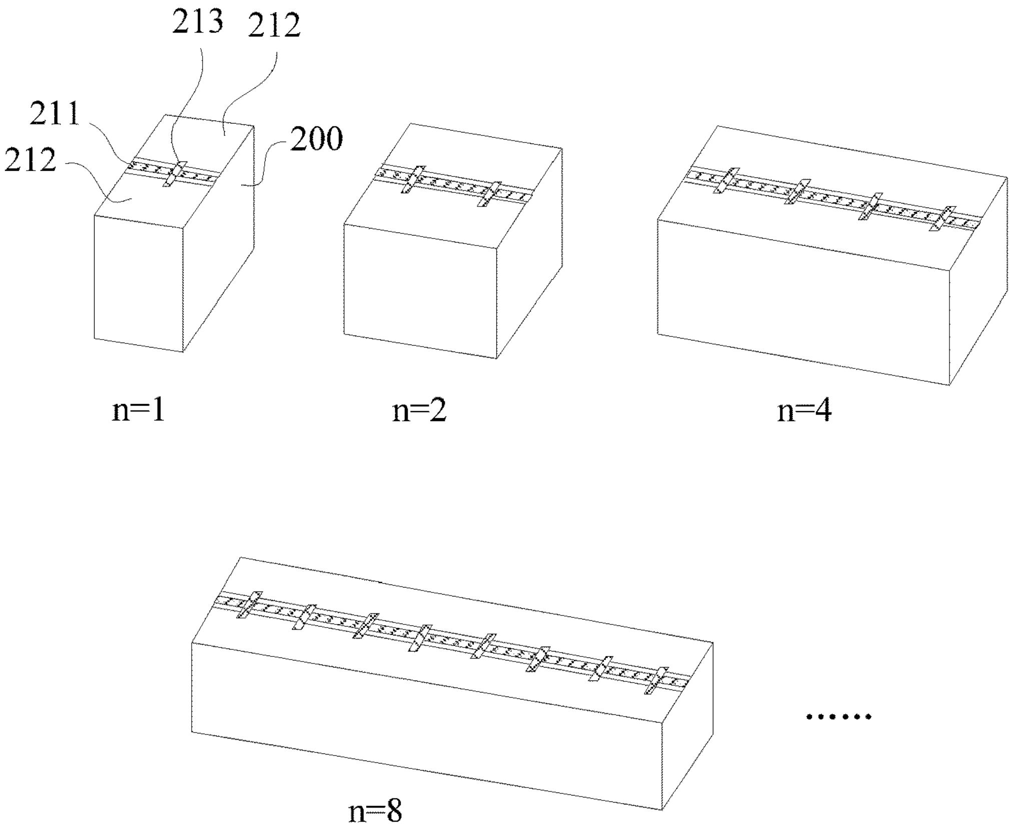
FIG. 4 is a schematic diagram of an MEMS phase-shifting multi-unit according to at least one embodiment of the present disclosure.

FIG. 4 is a schematic diagram of a structure of an MEMS phase-shifting multi-unit according to at least one embodiment of the present disclosure. In some exemplary embodiments, the MEMS phase-shifting unit may include n phase-shifting units, wherein n is a positive integer. As shown in FIG. 4, n may be 1, 2, 4, 8, etc. which is not limited in the present embodiment.

In some examples, as shown in FIG. 4, a single phase-shifting unit may include a CPW signal line 211 and CPW ground lines 212 disposed on a same surface of the dielectric substrate 200, an insulating layer covering the CPW signal line 211, and a metal bridge 213 disposed on the insulating layer. The CPW ground lines 212 are located on two opposite sides of the CPW signal line 211, and the metal bridge 213 stretches across the CPW signal line 211. A projection of the metal bridge 213 on the dielectric substrate 200 overlaps with both the CPW signal line 211 and the CPW ground lines 212. A floating part of the metal bridge 213 is deformed on the side close to the CPW signal line 211 under the action of electrostatic force by periodically loading a driving voltage on the metal bridge 213. A distance between the metal bridge 213 and the CPW signal line 211 is changed after the deformation of the metal bridge 213, which causes the load capacitance between the CPW signal line 211 and the metal bridge 213 to change, thus causing the transmission speed of a microwave signal transmitted on the CPW signal line 211 to change. The phase of the microwave signal changes with the change of transmission speed after the transmission rate of the microwave signal changes, which achieves a phase shifting of the microwave signal.

In some examples, when n=1, the phase-shifting degree of a single phase-shifting unit is 27.89 degrees and an insertion loss is −0.29 dB. When a period s between the phase-shifting units is 1.5 mm (that is, the distance between adjacent metal bridges is 1.5 mm), the coupling between multiple phase-shifting units may be neglected. For example, when n=16, an average phase-shifting degree of single phase-shifting units is 27.01 degrees, so only about 16 phase-shifting units are needed to complete the phase-shifting change of 360 degrees. In some examples, the MEMS phase-shifting multi-unit includes 16 phase-shifting units connected in sequence, and a feature impedance of the CPW structure in the MEMS phase-shifting multi-unit may be 100 ohms. However, the connection mode of multiple phase-shifting units in the MEMS phase-shifting multi-unit is not limited in this embodiment.

In some exemplary embodiments, as shown in FIG. 3, the first impedance transformation unit 23 is configured to achieve impedance matching between the feed structure 10 and the MEMS phase-shifting multi-unit 21, and the second impedance transformation unit 25 is configured to achieve impedance matching between the MEMS phase-shifting multi-unit 21 and the antenna 22. For example, if the feature impedance of the CPW structure in the MEMS phase-shifting multi-unit is 100 ohms, the first impedance transformation unit may transform the feature impedance of 50 ohms into 100 ohms to achieve the impedance matching between the feed structure and the MEMS phase-shifting multi-unit, and the second impedance transformation unit may transform the feature impedance of 100 ohms into 50 ohms to achieve the impedance matching between the MEMS phase-shifting multi-unit and the antenna. However, this is not limited in the present embodiment.

In some exemplary embodiments, as shown in FIG. 3, the first switching unit 24 is configured to achieve conversion from the MS structure to the CPW structure, so that the feed structure 10 is connected to the first switching unit 24 through an SMA corresponding to pins of the MS structure. The second switching unit 26 is configured to achieve conversion from the CPW structure to the MS structure so as to feed the antenna 22 through the MS structure.

Figure 5A:
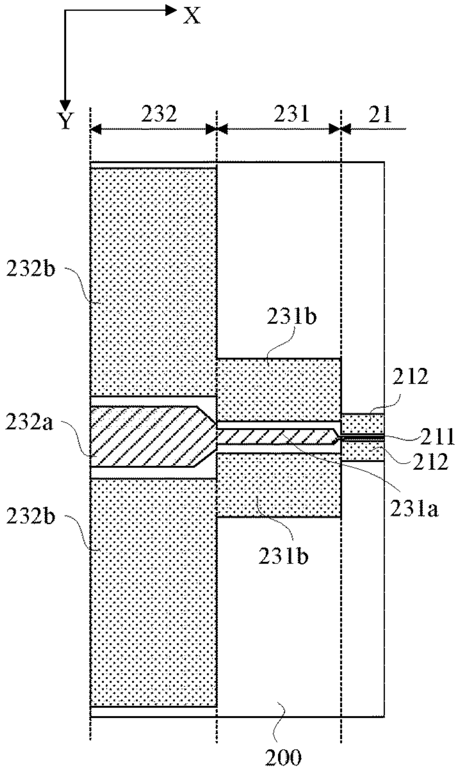
FIG. 5A is a schematic diagram of a structure of a first impedance transformation unit according to at least one embodiment of the present disclosure.

FIG. 5A is a schematic diagram of a structure of a first impedance transformation unit according to at least one embodiment of the present disclosure. FIG. 5A is a top view of the first impedance transformation unit. As shown in FIG. 5A, the first impedance transformation unit of this exemplary embodiment at least includes a first impedance structure 232 and a first impedance transformation structure 231. The first impedance structure 232 and the first impedance transformation structure 231 are both of CPW structures. A first end of the first impedance transformation structure 231 is connected to the CPW structure of the MEMS phase-shifting multi-unit 21, and a second end of the first impedance transformation structure 231 is connected to the first impedance structure 232. The first impedance structure 232 may be directly connected to the feed structure or through the first switching unit. For example, a first end of the first impedance structure 232 is connected to the first impedance transformation structure 231, and a second end of the first impedance structure 232 is connected to the SMA of the CPW structure pin corresponding to the feed structure, or the second end of the first impedance structure 232 is connected to the SMA of the MS structure pin corresponding to the feed structure through the first switching unit.

In some exemplary embodiments, the first impedance transformation unit may achieve ¼ wavelength impedance transformation. As shown in FIG. 5A, a feature impedance of the first impedance transformation structure 231 is denoted as $Z_1$, a feature impedance of the first impedance structure 232 is denoted as $Z_2$, and a feature impedance of the CPW structure of the MEMS phase-shifting multi-unit 21 is denoted $Z_3$, and the feature impedances $Z_1$, $Z_2$ and $Z_3$ meet the following equation: $Z_1=\sqrt{Z_2 \times Z_3}$.

In some exemplary embodiments, as shown in FIG. 5A, the first impedance structure 232 includes a first CPW signal line 232*a* and two first CPW ground lines 232*b* located on the dielectric substrate 200. The first CPW signal line 232*a* and the two first CPW ground lines 232*b* are located on a same surface of the dielectric substrate 200, and the two first CPW ground lines 232*b* are located on two opposite sides of the first CPW signal line 232*a*. The first CPW signal line 232*a* and the first CPW ground lines 232*b* all extend along a first direction X. The two first CPW ground lines 232*b* are symmetrical with respect to a center line of the first CPW signal line 232*a* along a second direction Y. The first direction X and the second direction Y are located on a same plane, and the first direction X is perpendicular to the second direction Y. The first impedance transformation structure 231 includes a second CPW signal line 231*a* and two second CPW ground lines 231*b* located on the dielectric substrate 200. The second CPW signal line 231*a* and the two second CPW ground lines 231*b* are located on a same surface of the dielectric substrate 200, and the two second CPW ground lines 231*b* are located on two opposite sides of the second CPW signal line 231*a*. The second CPW signal line 231*a* and the second CPW ground lines 231*b* all extend along the first direction X. The two second CPW ground lines 231*b* are symmetrical with respect to a center line of the first CPW signal line 231*a* along a second direction Y. The second CPW ground lines 231*b* are connected to the first CPW ground lines 232*b* in one-to-one correspondence and the second CPW signal line 231*a* is connected to the first CPW signal lines 232*a*. An average length of the second CPW signal line 231*a* along the second direction Y is smaller than an average length of the first CPW signal line 232*a* along the second direction Y and is larger than an average length of the CPW signal line 211 of the CPW structure of the MEMS phase-shifting multi-unit 21 along the second direction Y. An average length of the second CPW ground lines 231*b* along the second direction Y is smaller than an average length of the first CPW ground lines 232*b* along the second direction Y and is larger than an average length of the CPW ground line 212 of the CPW structure of the MEMS phase-shifting multi-unit 21 along the second direction Y.

In some examples, as shown in FIG. 5A, a projection of one end of the first CPW signal line 232*a* connected to the second CPW signal line 231*a* on the dielectric substrate 200 has two symmetrical corner cuts, which are symmetrical with respect to the center line of the first CPW signal line 232*a* parallel to the first direction X. A projection of one end of the second CPW signal line 231*a* connected to the CPW signal line of the CPW structure of the MEMS phase-shifting multi-unit 21 on the dielectric substrate 200 has two symmetrical corner cuts, which are symmetrical with respect to the center line of the second CPW signal line 231*a* parallel to the first direction X. However, this is not limited in the present embodiment. For example, projections of the second CPW signal line and the first CPW signal line on the dielectric substrate may both be rectangular.

Figure 5B:
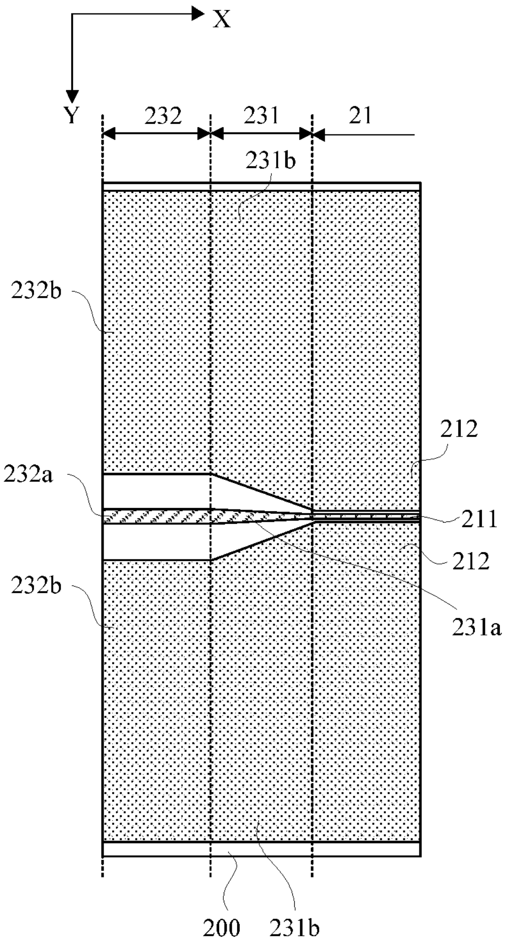
FIG. 5B is another schematic diagram of a structure of a first impedance transformation unit according to at least one embodiment of the present disclosure.

FIG. 5B is another schematic diagram of a structure of a first impedance transformation unit according to at least one embodiment of the present disclosure. FIG. 5B is a top view of the first impedance transformation unit. As shown in FIG. 5B, the first impedance transformation unit of this exemplary embodiment at least includes a first impedance structure 232 and a first impedance transformation structure 231. The first impedance structure 232 and the first impedance transformation structure 231 are both of CPW structures. In the first impedance transformation unit shown in FIG. 5B, the first impedance transformation structure 231 is a transition structure between the first impedance structure 232 and the CPW structure of the MEMS phase-shifting multi-unit 21. A length of the second CPW signal line 231*a* of the first impedance transformation structure 231 along the second direction Y gradually decreases along a direction away from the first impedance structure 232. For example, along the direction away from the first impedance structure 232, the length of the second CPW signal line 231*a* of the first impedance transformation structure 231 along the second direction Y gradually decreases from a length of the first CPW signal line 232*a* of the first impedance structure 232 along the second direction Y to a length of the CPW signal line 211 of the CPW structure of the MEMS phase-shifting multi-unit 21 along the second direction Y. A length of the second CPW ground lines 231*b* of the first impedance transformation structure 231 along the second direction Y gradually increases along the direction away from the first impedance structure 232, achieving the gradual impedance transformation. For example, along the direction away from the first impedance structure 232, the length of the second CPW ground lines 231*b* of the first impedance transformation structure 231 along the second direction Y gradually decreases from a length of the first CPW ground lines 232*b* of the first impedance structure 232 along the second direction Y to a length of the CPW ground line 212 of the CPW structure of the MEMS phase-shifting multi-unit 21 along the second direction Y. In this exemplary embodiment, the impedance transformation is achieved by a gradual structure of the first impedance transformation structure. Reference for the description of the rest of the structure of the first impedance transformation unit may be made to the embodiment shown in FIG. 5A, and will not be repeated here.

Figure 6A:
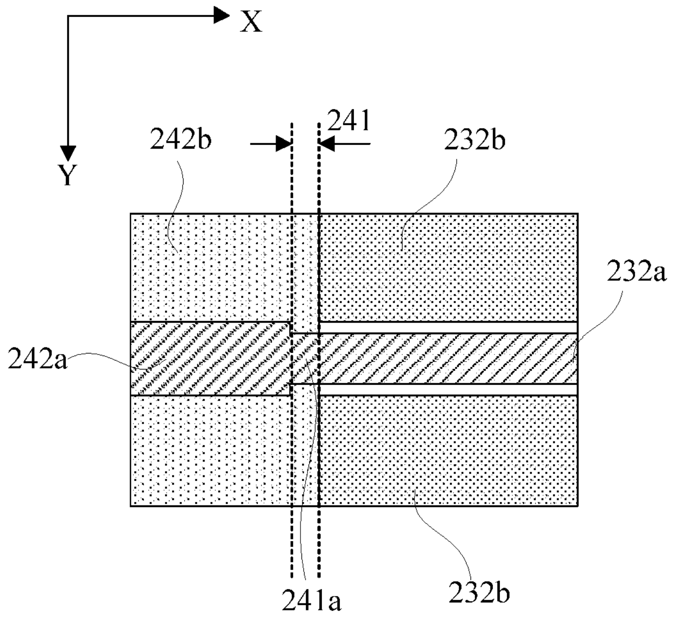
FIG. 6A is a schematic diagram of a structure of a first switching unit according to at least one embodiment of the present disclosure.

FIG. 6A is a schematic diagram of a structure of a first switching unit according to at least one embodiment of the present disclosure. FIG. 6A is a top view of the first switching unit. In some exemplary embodiments, the first switching unit is connected between the MS structure and the CPW structure to achieve the conversion from the MS structure to the CPW structure. As shown in FIG. 6A, the first switching unit includes a first switching structure 241, wherein the first switching structure 241 is connected between the MS structure and the CPW structure. Taking the phased array antenna system shown in FIG. 3 as an example, the MS structure connected to the first switching structure 241 may be connected to the feed structure, and the CPW structure connected to the first switching structure 241 may be the CPW structure of the first impedance transformation unit.

In some exemplary embodiments, as shown in FIG. 6A, the MS structure connected to the first switching structure 241 includes an MS ground line 242*b* located on a second surface of the dielectric substrate and an MS signal line 242*a* located on a first side of the dielectric substrate. The first surface and the second surface are two opposite surfaces of the dielectric substrate. The CPW structure connected to the first switching structure 241 includes a CPW signal line 232*a* and two CPW ground lines 232*b* located on the first surface of the dielectric substrate. Two CPW ground lines 232*b* are located on two opposite sides of the CPW signal line 232*a*. The first switching structure 241 includes a signal switching line 241*a* located on the first surface of the dielectric substrate and a first switching ground line located on the second surface of the dielectric substrate. Two ends of the signal switching line 241*a* are respectively connected to the MS signal line 242*a* of the MS structure and the CPW signal line 232*a* of the CPW structure, and the first switching ground line is formed by extending the MS ground line 242*b* of the MS structure. A length of the signal switching line 241*a* along the second direction Y is smaller than a length of the MS signal line 242*a* of the MS structure along the second direction Y and may be equal to a length of the CPW signal line 232*a* of the CPW structure along the second direction Y.

Figure 6B:
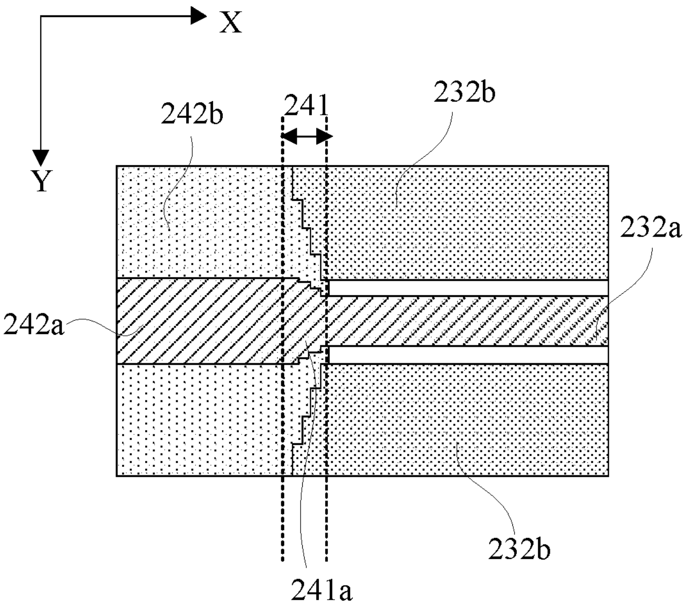
FIG. 6B is another schematic diagram of a structure of a first switching unit according to at least one embodiment of the present disclosure.

FIG. 6B is another schematic diagram of a structure of a first switching unit according to at least one embodiment of the present disclosure. FIG. 6B is a top view of the first switching unit. As shown in FIG. 6B, the first switching unit includes a first switching structure 241 connected between the MS structure and the CPW structure. The first switching structure 241 includes a signal switching line 241*a* and a second switching ground line located on a first surface of the dielectric substrate, and a first switching ground line located on a second surface of the dielectric substrate. A length of the signal switching line 241*a* of the first switching structure 241 in the second direction Y decreases in a stepped manner along the direction away from the MS structure until it is the same as the length of the CPW signal line 232*a* of the CPW structure in the second direction Y. The signal switching line 241*a* extends along the first direction X, and has an edge changing in a stepped manner along the extending direction. The first switching ground line of the first switching structure 241 is formed by extending the MS switching ground line 242*b* of the MS structure, and one side of the first switching ground line close to the CPW structure has an edge changing in a stepped manner. A length of the first switching ground line in the second direction Y decreases in a stepped manner along the direction away from the MS structure. The second switching ground line is formed by extending the CPW switching ground line 232*b* of the CPW structure, and one side of the second switching ground line close to the MS structure has an edge changing in a stepped manner. A length of the second switching ground line in the second direction Y increases in a stepped manner along the direction away from the MS structure. A projection of the signal switching line 241*a* on the dielectric substrate is located within a projection of the first switching ground line on the dielectric substrate. An interface between the projections of the first switching ground line and the second switching ground line on the dielectric substrate has a stepped shape. Reference for the rest of the structure of the first switching unit may be made to the embodiment shown in FIG. 6A, and will not be repeated here. Compared with the first switching unit provided in FIG. 6A, the first switching unit provided in FIG. 6B may avoid a sudden change of the electric field from the MS structure to the CPW structure, thereby reducing the differential loss.

Figure 6C:
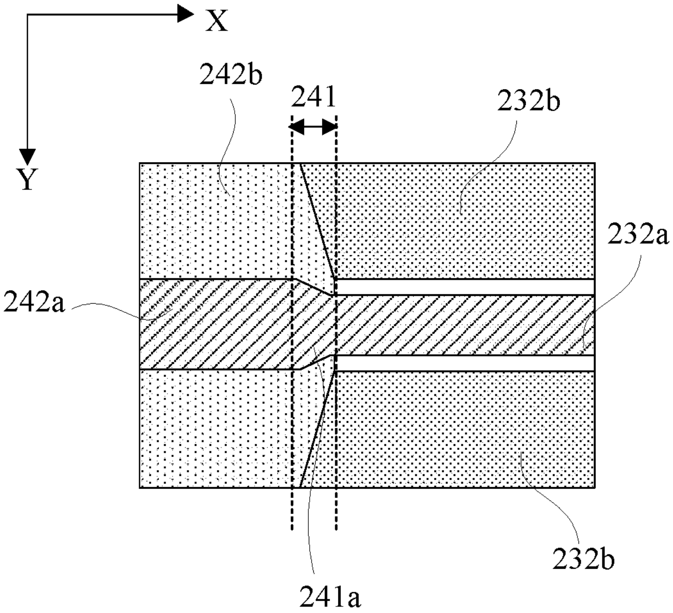
FIG. 6C is another schematic diagram of a structure of a first switching unit according to at least one embodiment of the present disclosure.

FIG. 6C is another schematic diagram of a structure of a first switching unit according to at least one embodiment of the present disclosure. FIG. 6C is a top view of the first switching unit. In some exemplary embodiments, as shown in FIG. 6C, the signal switching line 241*a* of the first switching structure 241 has a gradually changing edge along the first direction X, one side of the first switching ground line close to the CPW structure has a gradually changing edge, and one side of the second switching ground line close to the MS structure has a gradually changing edge. Reference for the rest of the structure of the first switching unit according to the exemplary embodiment may be made to the embodiment shown in FIG. 6A, which will not be repeated here.

Figure 6D:
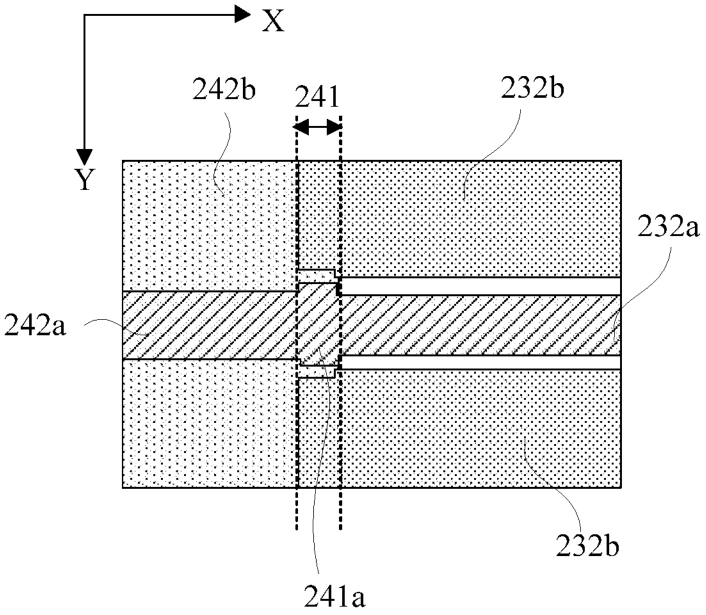
FIG. 6D is another schematic diagram of a structure of a first switching unit according to at least one embodiment of the present disclosure.

FIG. 6D is another schematic diagram of a structure of a first switching unit according to at least one embodiment of the present disclosure. FIG. 6D is a top view of the first switching unit. In some exemplary embodiments, as shown in FIG. 6D, the first switching structure 241 may include a grounded coplanar waveguide (GCPW) structure. Here, the first switching structure 241 includes a signal switching line 241*a* and second switching ground lines located on a first surface of the dielectric substrate, and a first switching ground line located on a second surface of the dielectric substrate. The first switching ground line is formed by extending an MS ground line 242*b* of the MS structure, and the second switching ground lines are formed by extending a CPW ground line 232*b* of the CPW structure. The second switching ground lines are located on two opposite sides of the signal switching ground line 241*a*. A length of the signal switching line 241*a* along the second direction Y is greater than a length of the MS signal line 242*a* of the MS structure along the second direction Y and is larger than a length of the CPW signal line 232*a* of the CPW structure along the second direction Y. A projection of the signal switching line 241*a* on the dielectric substrate is located within a projection of the first switching ground line on the dielectric substrate.

In this exemplary embodiment, the transition between CPW structure and MS structure may be well achieved by adopting one GCPW.

In some exemplary embodiments, a second switching unit is connected between the CPW structure and the MS structure to achieve the conversion from the CPW structure to the MS structure. The second switching unit and the first switching unit may be mirrored with respect to a center line of the MEMS phase shifting multi-unit along a first direction X. However, this is not limited in the present embodiment.

In some exemplary embodiments, the second impedance transformation unit and the first impedance transformation unit may be mirrored with respect to the center line of the MEMS phase shifting multi-unit along the first direction X. However, this is not limited in the present embodiment.

Figure 7:
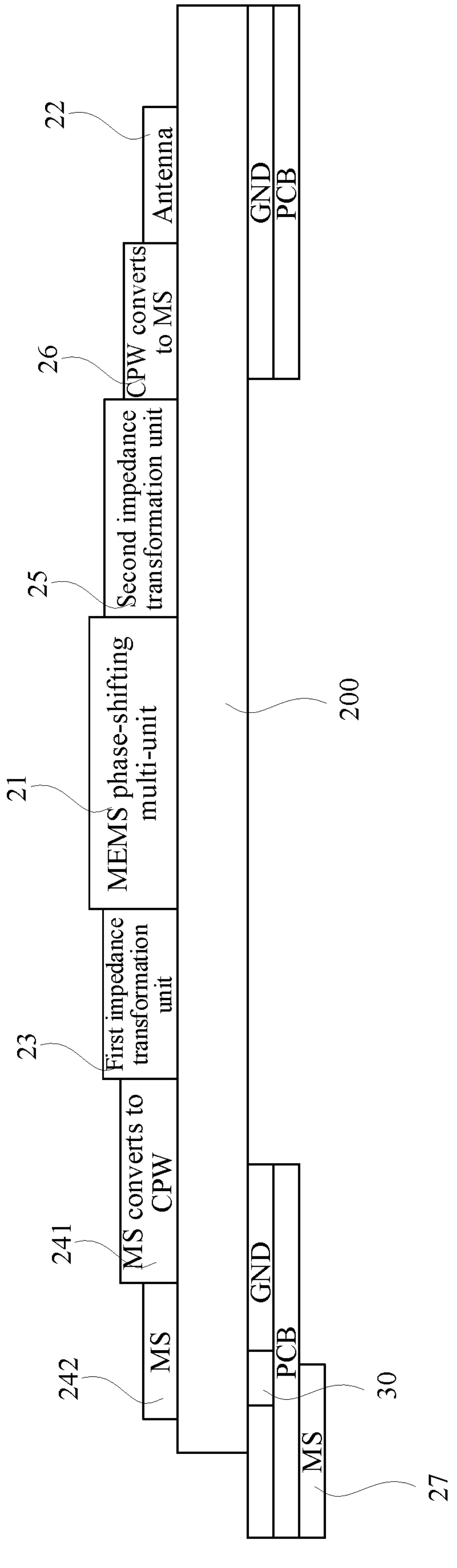
FIG. 7 is another schematic diagram of a structure of a phased array antenna element according to at least one embodiment of the present disclosure.
Figure 8:
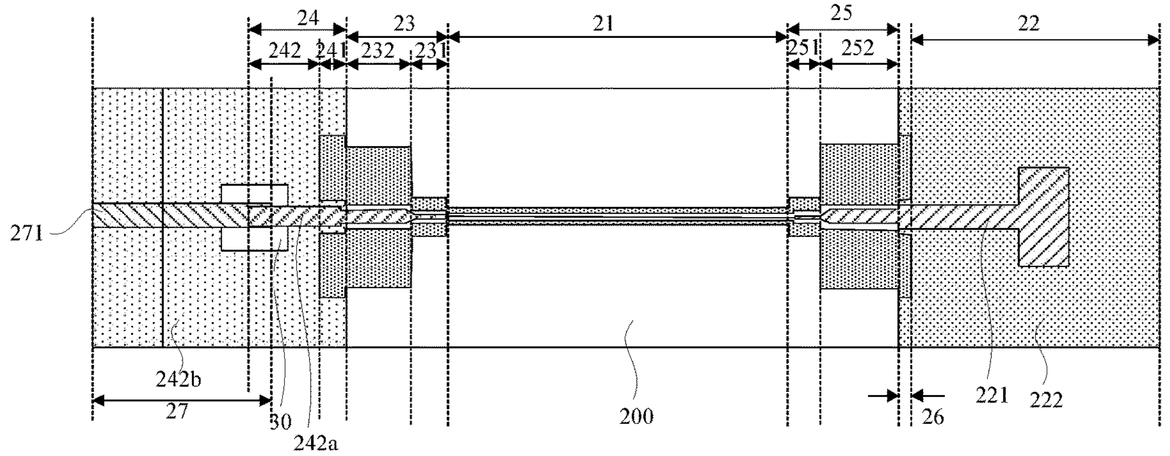
FIG. 8 is a top view of the phased array antenna element shown in FIG. 7.

FIG. 7 is another schematic diagram of a structure of a phased array antenna element according to at least one embodiment of the present disclosure. FIG. 8 is a top view of the phased array antenna element shown in FIG. 7. In some exemplary embodiments, the dielectric substrate of the phased array antenna element is made of glass, and a feeding mode of the feed structure is a coupling feeding mode. However, a material of the dielectric substrate is not limited in this embodiment.

As shown in FIG. 7 and FIG. 8, a phased array antenna element of this exemplary embodiment includes a first switching unit 24, a first impedance transformation unit 23, an MEMS phase-shifting multi-unit 21, a second impedance transformation unit 25, a second switching unit 26, an antenna 22 and a slot coupling structure 27. The first switching unit 24 achieves the conversion from an MS structure to a CPW structure, and may include a first switching structure 241 and an MS structure 242, for example. The second switching unit 26 achieves the conversion from a CPW structure to an MS structure. The first impedance transformation unit 23 includes a first impedance structure 232 and a first impedance transformation structure 231. The second impedance transformation unit 25 includes a second impedance unit 252 and a second impedance transformation structure 251. The first impedance transformation unit 23 and the second impedance transformation unit 25 are mirrored with respect to a center line of the MEMS phase-shifting multi-unit 21. The antenna 22 may be a patch antenna. The antenna 22 includes an antenna signal line 221 and an antenna ground line 222. The antenna 22 and the second switching unit 26 may share an MS ground (GND) line provided on a first circuit board (e.g., a Printed Circuit Board (PCB)). The first switching unit 24 and the slot coupling structure 27 may share the MS ground line provided on a second circuit substrate. Reference regarding structures of the first impedance transformation unit, the second impedance transformation unit, the MEMS phase-shifting multi-unit, the first switching unit and the second switching unit may be made to the aforementioned embodiments, which will not be further described here.

In some exemplary embodiments, as shown in FIGS. 7 and 8, the slot coupling structure 27 is connected to the feed structure. The slot coupling structure 27 is an MS structure, and feeds the first switching unit 24 by slot coupling. The first switching unit 24 includes a first switching structure 241 and an MS structure 242. The MS structure 242 includes an MS signal line 242*a* on a first surface of the dielectric substrate 200 and an MS ground line 242*b* on a second surface of the dielectric substrate 200. In this example, the MS ground line 242*b* is disposed on the second circuit substrate, and the MS ground line 242*b* has a slot 30, and the slot 30 is rectangular, for example. The gap coupling structure 27 includes an MS signal line 271 located on a side of the second circuit substrate away from the MS ground line 242*b*. The MS signal line 271 and the MS signal line 242*a* share the MS ground line 242*b*. A projection of the MS signal line 271 on the dielectric substrate 200 overlaps with a projection of the MS signal line 242*a* on the dielectric substrate 200, and an overlapping part between the two projections is located within a projection of the slot 30 on the dielectric substrate 300. In this exemplary embodiment, slot coupling feed is achieved through the coupling effect between the MS signal line 271 and the MS signal line 242*a*.

Figure 9:
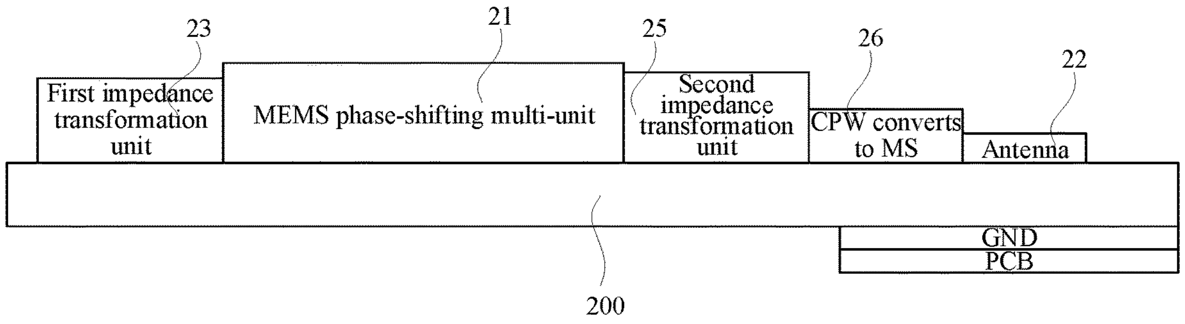
FIG. 9 is another schematic diagram of a structure of a phased array antenna element according to at least one embodiment of the present disclosure.
Figure 10:
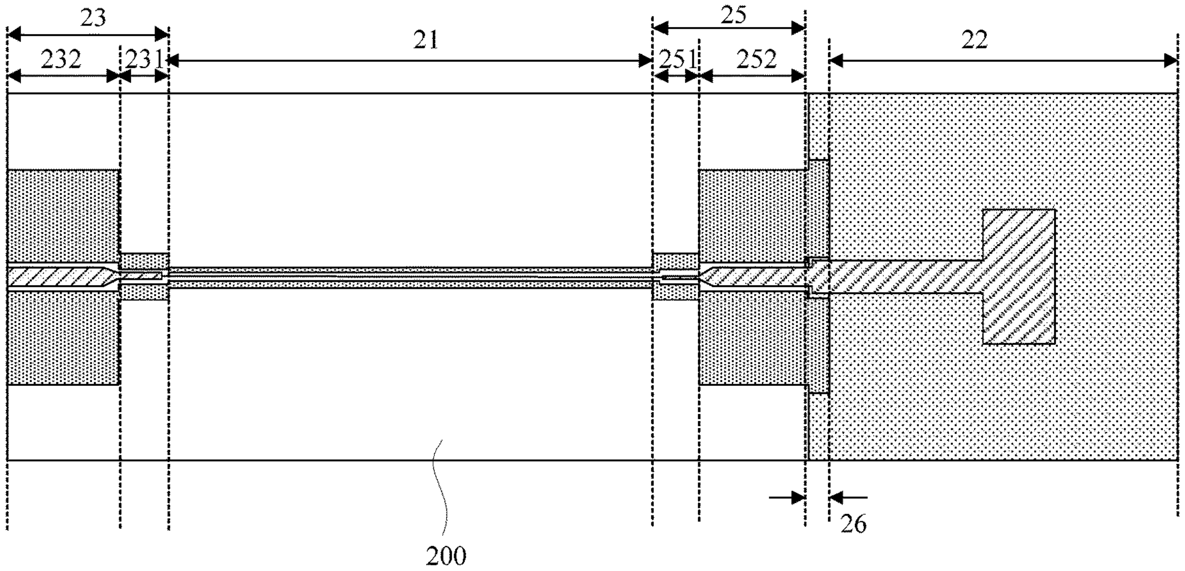
FIG. 10 is a top view of the phased array antenna element shown in FIG. 9.

FIG. 9 is another schematic diagram of a structure of a phased array antenna element according to at least one embodiment of the present disclosure. FIG. 10 is a top view of the phased array antenna element shown in FIG. 9. In this exemplary embodiment, the dielectric substrate 200 of the phased array antenna element may be made of glass, and a feeding mode of the feed structure is direct feeding mode. As shown in FIGS. 9 and 10, the phased array antenna element of this exemplary embodiment includes an MEMS phase-shifting multi-unit 21, an antenna 22, a first impedance transformation unit 23, a second impedance transformation unit 25, and a second switching unit 26. The second switching unit 26 achieves the conversion from a CPW structure to an MS structure. The first impedance transformation unit 23 includes a first impedance structure 232 and a first impedance transformation structure 231. The second impedance transformation unit 25 includes a second impedance unit 252 and a second impedance transformation structure 251. The first impedance transformation unit 23 and the second impedance transformation unit 25 are mirrored with respect to the center line of the MEMS phase-shifting multi-unit 21. The antenna 22 may be a patch antenna. The antenna 22 and the second switching unit 26 may share an MS ground line provided on a first circuit board. Reference regarding structures of the first impedance transformation unit, the second impedance transformation, the MEMS phase-shifting multi-unit, and the second switching unit may be made to the aforementioned embodiments, which will not be further described here. In this exemplary embodiment, the first impedance structure 232 may be directly connected to the SMA corresponding to the pin of the CPW structure to achieve direct feeding.

Figure 11A:
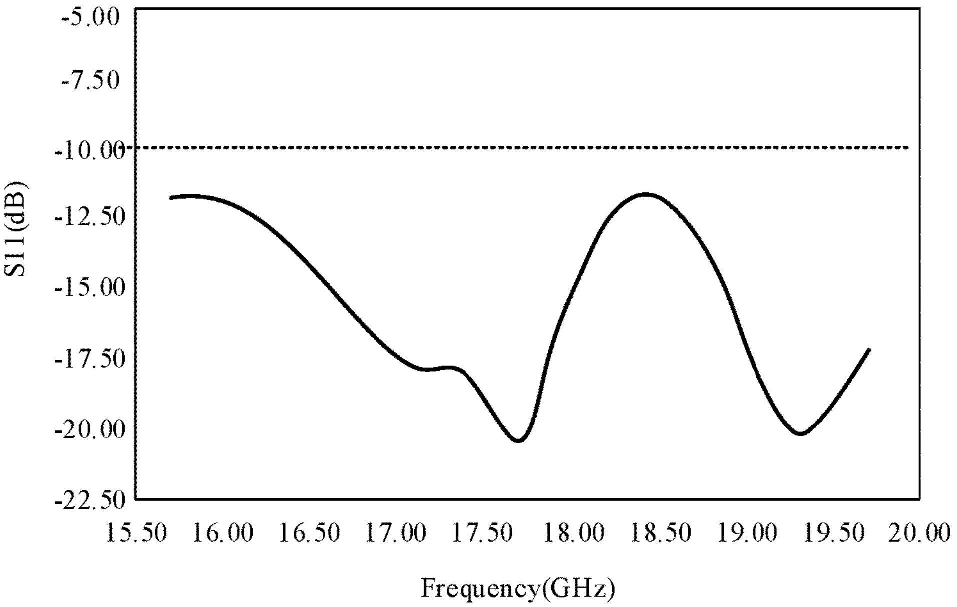
FIGS. 11A to 11D are schematic diagrams of simulation results of the phased array antenna element shown in FIG. 9.
Figure 11B:
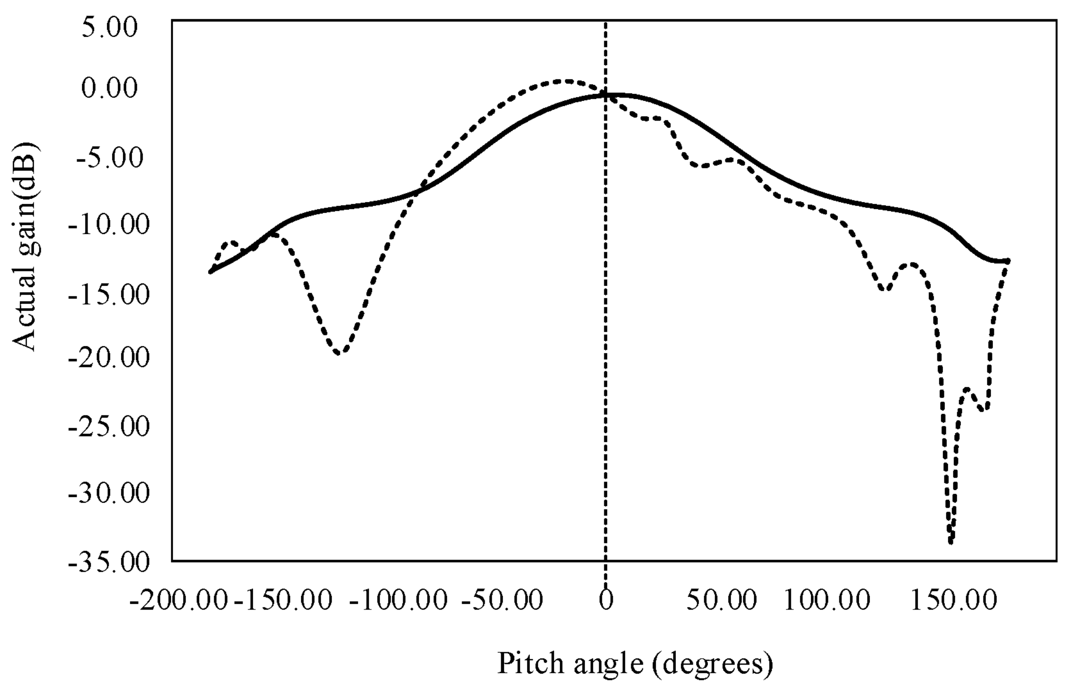
Figure 11C:
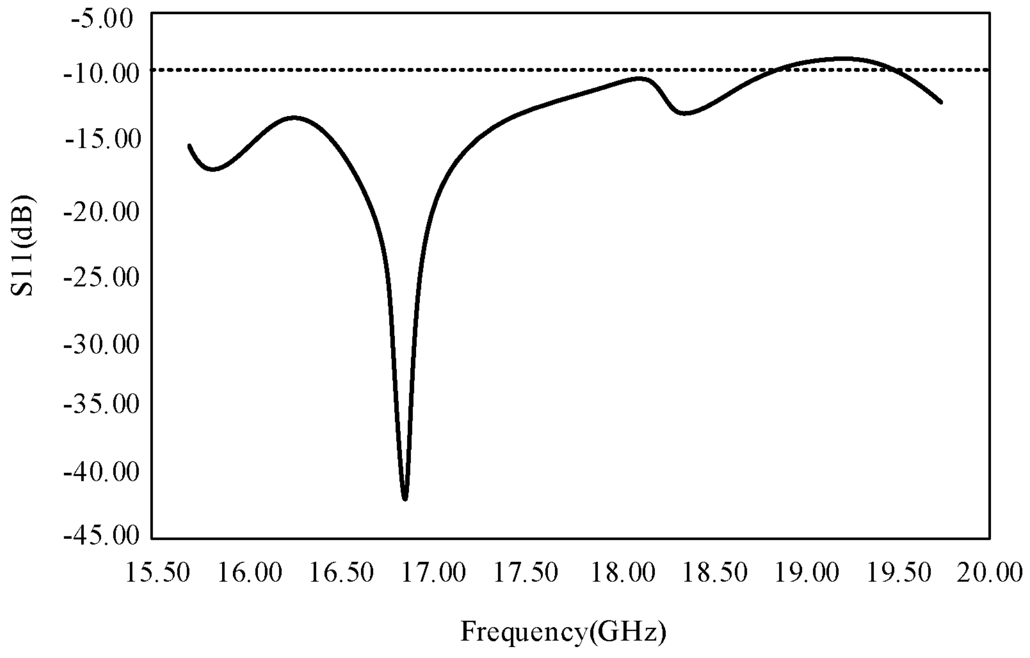
Figure 11D:
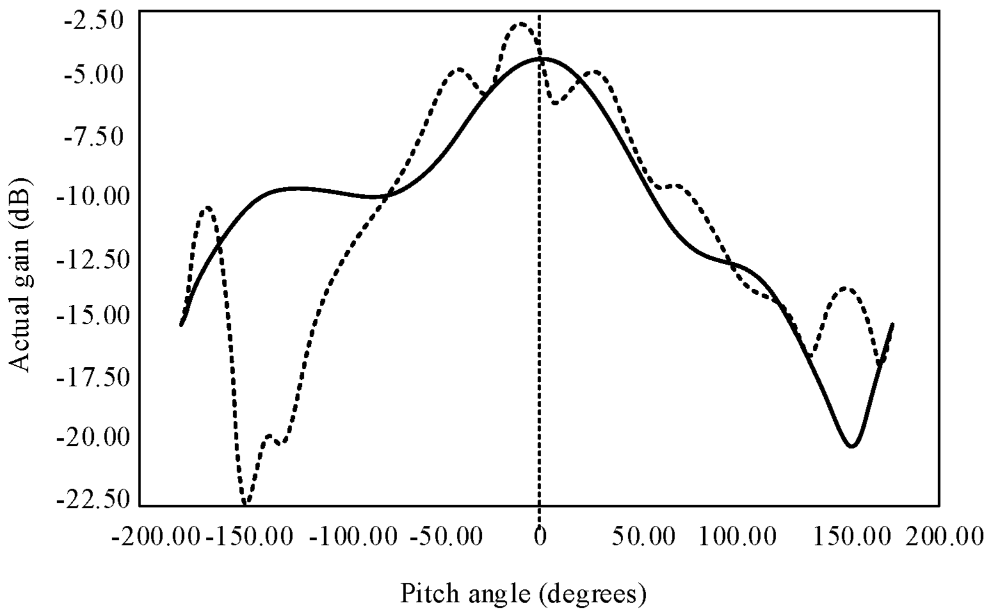

FIGS. 11A to 11D are schematic diagrams of simulation results of the phased array antenna element shown in FIG. 9. The abscissa of FIG. 11B and FIG. 11D is a pitch angle θ, which shows an included angle with respect to the Z axis, and the ordinate is an actual gain. The solid lines in FIG. 11B and FIG. 11D represent a curve of the actual gain values of the phased array antenna elements corresponding to different values of θ when the azimuth angle φ=0 degree, that is, a radiation pattern of the xoz plane. Similarly, the dashed lines in FIG. 11B and FIG. 11D represent a curve of the actual gain values of the phased array antenna elements corresponding to different values of θ when the azimuth angle φ=90 degrees, that is, a radiation pattern of the yoz plane.

FIGS. 11A and 11B are the curve of the S11 parameter and the plane radiation pattern of the direct feeding port when the metal bridges in the MEMS phase-shifting multi-unit in FIG. 9 are all in an Up state (that is, no driving voltage is applied to the metal bridge). As shown in FIG. 11A and FIG. 11B, when the metal bridges in the MEMS phase-shifting multi-unit are all in the Up state, when the S11 parameters are less than −6 dB and −10 dB, the impedance bandwidth of the phased array antenna elements is 15.7 GHz to 19.7

Ghz, and the actual gain may be −0.52 dB, and the 3 dB beam widths in xoz plane and yoz plane are 94 degrees and 86 degrees respectively.

FIGS. 11C and 11D are the curve of the S11 parameter and the plane radiation pattern of the direct feeding port when the metal bridges in the MEMS phase-shifting multi-unit in FIG. 9 are all in an Down state (that is, the driving voltage is applied to the metal bridge). As shown in FIG. 11C and FIG. 11D, when the metal bridges in the MEMS phase-shifting multi-unit are all in the Down state, when the S11 parameters are less than −6 dB, the impedance bandwidth of the phased array antenna elements is 15.7 GHz to 19.7 Ghz, when the S11 parameters are less than −10 dB, the impedance bandwidth of the phased array antenna elements is 15.7 GHz to 18.76 Ghz, and the actual gain may be −4.39 dB, and the 3 dB beam widths in xoz plane and yoz plane are 80 degrees and 56 degrees respectively.

Figure 12:
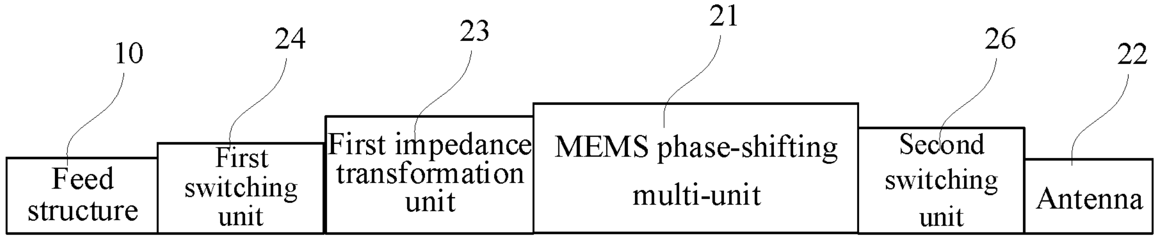
FIG. 12 is another schematic diagram of a structure of a phased array antenna element according to at least one embodiment of the present disclosure.

FIG. 12 is another schematic diagram of a structure of a phased array antenna element according to at least one embodiment of the present disclosure. As shown in FIG. 12, the phased array antenna element of this exemplary embodiment includes an MEMS phase-shifting multi-unit 21, an antenna 22, a first impedance transformation unit 23, a first switching unit 24, and a second switching unit 26. The first switching unit 24 is connected between the feed structure 10 and the first impedance transformation unit 23, the MEMS phase shifting multi-unit 21 is connected between the first impedance transformation unit 23 and the second switching unit 26, and the second switching unit 26 is connected between the MEMS phase-shifting multi-unit 21 and the antenna 22. In some examples, The MEMS phase-shifting multi-unit 21 includes a CPW structure with a feature impedance greater than 50 ohms. For example, the feature impedance of the CPW structure in the MEMS phase-shifting multi-unit may be 100 ohms. However, this is not limited in the present embodiment. Reference regarding structures of the MEMS phase-shifting multi-unit, the first impedance transformation unit, the first switching unit and the second switching unit may be made to the aforementioned embodiments, which will not be further described here.

Figure 13:
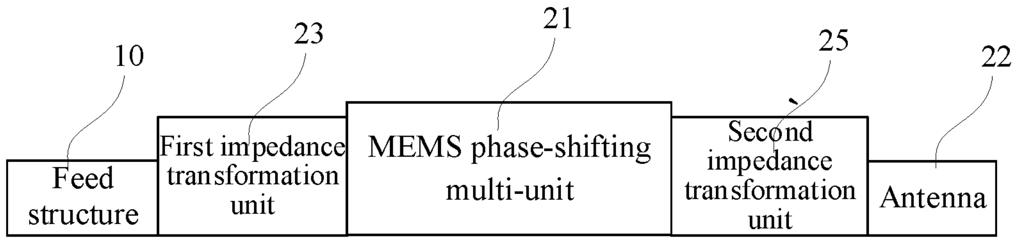
FIG. 13 is another schematic diagram of a structure of a phased array antenna element according to at least one embodiment of the present disclosure.

FIG. 13 is a schematic diagram of a structure of a phased array antenna element according to at least one embodiment of the present disclosure. As shown in FIG. 13, the phased array antenna element of this exemplary embodiment includes an MEMS phase-shifting multi-unit 21, an antenna 22, a first impedance transformation unit 23 and a second impedance transformation unit 25. The first impedance transformation unit 23 is connected between the feed structure 10 and the MEMS phase-shifting multi-unit 21, and the MEMS phase-shifting multi-unit 21 is connected between the first impedance transformation unit 23 and the second impedance transformation unit 25, and the second impedance transformation unit 25 is connected to the antenna 22. In some examples, an MEMS phase-shifting multi-unit 21 includes a CPW structure with a feature impedance greater than 50 ohms. For example, the feature impedance of the CPW structure in the MEMS phase-shifting multi-unit may be 100 ohms. However, this is not limited in the present embodiment. Reference regarding structures of the MEMS phase-shifting multi-unit, the first impedance transformation unit and the second impedance transformation unit may be made to the aforementioned embodiments, which will not be further described here.

Figure 14:
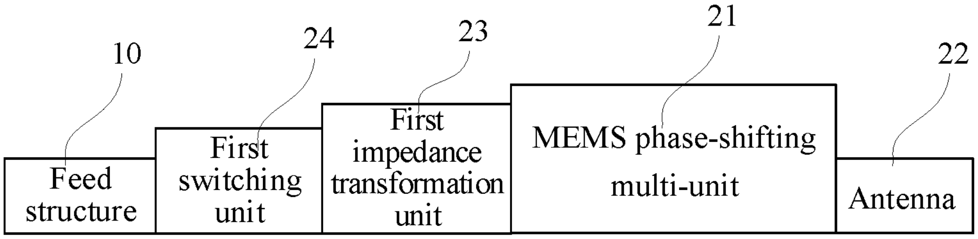
FIG. 14 is another schematic diagram of a structure of a phased array antenna element according to at least one embodiment of the present disclosure.

FIG. 14 is another schematic diagram of a structure of a phased array antenna element according to at least one embodiment of the present disclosure. As shown in FIG. 14, the phased array antenna element of this exemplary embodiment includes an MEMS phase-shifting multi-unit 21, an antenna 22, a first impedance transformation unit 23 and a first switching unit 24. The first switching unit 24 is connected between the feed structure 10 and the first impedance transformation unit 23, and the MEMS phase-shifting multi-unit 21 is connected between the first impedance transformation unit 23 and the antenna 22. In some examples, an MEMS phase-shifting multi-unit 21 includes a CPW structure with a feature impedance greater than 50 ohms. For example, the feature impedance of the CPW structure in the MEMS phase-shifting multi-unit may be 100 ohms. However, this is not limited in the present embodiment. Reference regarding structures of the MEMS phase-shifting multi-unit, the first impedance transformation unit and the first switching unit may be made to the aforementioned embodiments, and will not be further described here.

Figure 15:
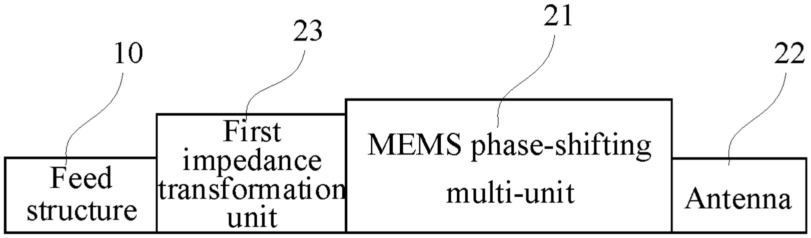
FIG. 15 is another schematic diagram of a structure of a phased array antenna element according to at least one embodiment of the present disclosure.

FIG. 15 is another schematic diagram of a structure of a phased array antenna element according to at least one embodiment of the present disclosure. As shown in FIG. 15, the phased array antenna element of this exemplary embodiment includes an MEMS phase-shifting multi-unit 21, an antenna 22 and a first impedance transformation unit 23. The first impedance transformation unit 23 is connected between the feed structure 10 and the MEMS phase-shifting multi-unit 21, and the MEMS phase-shifting multi-unit 21 is connected to the antenna 22. In some examples, an MEMS phase-shifting multi-unit 21 includes a CPW structure with a feature impedance greater than 50 ohms. For example, the feature impedance of the CPW structure in the MEMS phase-shifting multi-unit may be 100 ohms. However, this is not limited in the present embodiment. Reference regarding structures of the MEMS phase-shifting multi-unit and the first impedance transformation unit may be made to the aforementioned embodiments, and will not be further described here.

Figure 16:
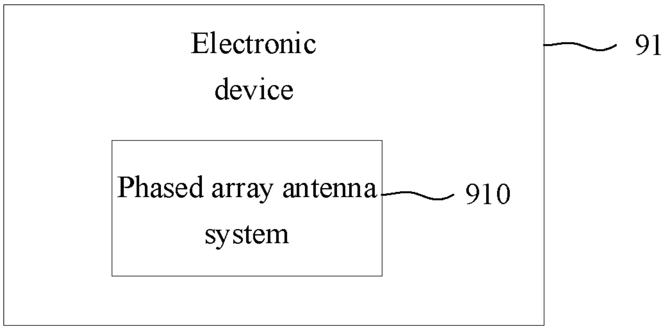
FIG. 16 is a schematic diagram of an electronic device according to at least one embodiment of the present disclosure.

FIG. 16 is a schematic diagram of an electronic device according to at least one embodiment of the present disclosure. As shown in FIG. 16, the embodiment provides an electronic device 91, which includes a phased array antenna system 910, wherein the phased array antenna system 910 is a phased array antenna system according to the previous embodiments. The electronic device 91 may be any product or component with communication function such as a smart phone, a navigation device, a game machine, a television (TV), a car audio, a tablet computer, a personal multimedia player (PMP), a personal digital assistant (PDA), etc. However, this is not limited in the present embodiment.

The drawings in the present disclosure only refer to the structures involved in the present disclosure, and common designs may be referred to for other structures. The embodiments of the present disclosure and the features in the embodiments may be combined with each other to obtain a new embodiment if there is no conflict.

Those of ordinary skills in the art should understand that modifications or equivalent substitutions may be made to the technical solutions of the present disclosure without departing from the essence and scope of the technical solutions of the present disclosure, all of which should be included within the scope of the claims of the present disclosure.

What we claim is:

1. A phased array antenna system, comprising:

a feed structure and at least one phased array antenna element, wherein the at least one phased array antenna element comprises a first impedance transformation unit, a micro electromechanical system (MEMS) phase-shifting multi-unit and an antenna;

the first impedance transformation unit is connected to the feed structure, and the MEMS phase-shifting multi-unit is connected between the first impedance transformation unit and the antenna;

wherein the at least one phased array antenna element further comprises a second impedance transformation unit connected between the MEMS phase-shifting multi-unit and the antenna.

2. The phased array antenna system according to claim 1, wherein the MEMS phase-shifting multi-unit comprises a coplanar waveguide structure with a feature impedance greater than 50 ohms.

3. The phased array antenna system according to claim 2, wherein the at least one phased array antenna element further comprises at least one switching unit connected to the first impedance transformation unit or the MEMS phase-shifting multi-unit, and is configured to achieve conversion between a micro-strip structure and a coplanar waveguide structure.

4. The phased array antenna system according to claim 3, wherein the at least one switching unit comprises a first switching unit connected between the feed structure and the first impedance transformation unit and is configured to achieve conversion from the micro-strip structure to the coplanar waveguide structure.

5. The phased array antenna system according to claim 2, wherein the at least one phased array antenna element further comprises a second impedance transformation unit connected between the MEMS phase-shifting multi-unit and the antenna.

6. The phased array antenna system according to claim 1, wherein the at least one phased array antenna element further comprises at least one switching unit connected to the first impedance transformation unit or the MEMS phase-shifting multi-unit, and is configured to achieve conversion between a micro-strip structure and a coplanar waveguide structure.

7. The phased array antenna system according to claim 6, wherein the at least one switching unit comprises a first switching unit connected between the feed structure and the first impedance transformation unit and is configured to achieve conversion from the micro-strip structure to the coplanar waveguide structure.

8. The phased array antenna system according to claim 7, further comprising a slot coupling structure, wherein the slot coupling structure is connected to the feed structure and is configured to feed the first switching unit by slot coupling.

9. The phased array antenna system according to claim 7, wherein the at least one switching unit comprises a second switching unit connected between the MEMS phase-shifting multi-unit and the antenna and is configured to achieve conversion from the coplanar waveguide structure to the micro-strip structure.

10. The phased array antenna system according to claim 6, wherein the at least one switching unit comprises a second switching unit connected between the MEMS phase-shifting multi-unit and the antenna and is configured to achieve conversion from the coplanar waveguide structure to the micro-strip structure.

11. The phased array antenna system according to claim 6, wherein the at least one switching unit comprises a switching structure connected between the micro-strip structure and the coplanar waveguide structure;

the switching structure comprises a signal switching line disposed on a first surface of a dielectric substrate and a first switching ground line disposed on a second surface of the dielectric substrate opposite to the first surface; the signal switching line is connected between a micro-strip signal line of the micro-strip structure and a coplanar waveguide signal line of the coplanar waveguide structure, the first switching ground line is formed by extending a micro-strip ground line of the micro-strip structure, and a projection of the signal switching line on the dielectric substrate is located within a projection of the first switching ground line on the dielectric substrate.

12. The phased array antenna system according to claim 11, wherein the switching structure further comprises a second switching ground line disposed on the first surface of the dielectric substrate; the second switching ground line is formed by extending the coplanar waveguide switching ground line of the coplanar waveguide structure;

the signal switching line of the switching structure has an edge changing in a stepped manner along an extending direction, the first switching ground line has an edge changing in a stepped manner at a side close to the coplanar waveguide structure, and the second switching ground line has an edge changing in a stepped manner at a side close to the micro-strip structure; or, the signal switching line of the switching structure has a gradually changing edge along the extending direction, the first switching ground line has a gradually changing edge at the side close to the coplanar waveguide structure, and the second switching ground line has a gradually changing edge at the side close to the micro-strip structure.

13. The phased array antenna system according to claim 6, wherein the at least one switching unit comprises a switching structure connected between the micro-strip structure and the coplanar waveguide structure, and the switching structure comprises a grounded coplanar waveguide structure.

14. The phased array antenna system according to claim 6, wherein the at least one phased array antenna element further comprises a second impedance transformation unit connected between the MEMS phase-shifting multi-unit and the antenna.

15. The phased array antenna system according to claim 1, wherein the first impedance transformation unit at least comprises a first impedance transformation structure connected between two coplanar waveguide structures with different feature impedances;

a feature impedance $Z_1$ of the first impedance transformation structure and feature impedances $Z_2$ and $Z_3$ of the two coplanar waveguide structures connected to the first impedance transformation structure meet a following equation:

$$Z_1=\sqrt{Z_2\times Z_3};$$

or, the first impedance transformation structure is a gradual transition structure connected between the two coplanar waveguide structures with different feature impedances.

16. The phased array antenna system according to claim 1, wherein the feed structure comprises a feed unit;

the feed unit comprises a DC power supply, a vector network analyzer, a DC block, a T-shaped biaser and a radio frequency coaxial connector SMA; the DC block is connected to the vector network analyzer, the T-type biaser is connected between the DC block and the SMA, the DC power supply is connected to the T-type biaser, and the SMA is connected to a phased array antenna element; or the feed unit comprises a DC power supply, a vector network analyzer, a control circuit, a flexible circuit board and an SMA; the control circuit is connected to the DC power supply; the flexible circuit board is connected between the control circuit and the phased array antenna element, and the SMA is connected between the vector network analyzer and the phased array antenna element.

17. The phased array antenna system according to claim 16, wherein the feed structure further comprises a power division network connected between the feed unit and a plurality of phased array antenna elements.

18. The phased array antenna system according to claim 1, wherein the MEMS phase-shifting multi-unit comprises at least sixteen phase-shifting units, and at least one phase-shifting unit comprises a coplanar waveguide signal line and a coplanar waveguide ground line located on a same surface of the dielectric substrate, an insulating layer covering the coplanar waveguide signal line, and a metal bridge located on a side of the insulating layer away from the dielectric substrate, wherein the metal bridge stretches across the coplanar waveguide signal line, and the coplanar waveguide signal lines of the sixteen phase-shifting units are connected in sequence.

19. An electronic device comprising the phased array antenna system according to claim 1.

* * * * *